US 11,628,590 B2

(12) United States Patent
Moon

(10) Patent No.: US 11,628,590 B2
(45) Date of Patent: *Apr. 18, 2023

(54) ENHANCED PERFORMANCE OF WOOD AND ENGINEERED WOOD PRODUCTS USING COMBINED DURABILITY AND FLAME RETARDANCY

(71) Applicant: Wood Modification Technologies Limited, Auckland (NZ)

(72) Inventor: Ronald Philip Moon, Auckland (NZ)

(73) Assignee: Wood Modification Technologies Limited, Auckland (NZ)

( * ) Notice: Subject to any disclaimer, the term of this patent is extended or adjusted under 35 U.S.C. 154(b) by 0 days.

This patent is subject to a terminal disclaimer.

(21) Appl. No.: 17/831,385

(22) Filed: Jun. 2, 2022

(65) Prior Publication Data

US 2022/0288808 A1 Sep. 15, 2022

Related U.S. Application Data

(63) Continuation of application No. 16/626,703, filed as application No. PCT/NZ2018/050092 on Jun. 27, 2018, now Pat. No. 11,370,146.

(30) Foreign Application Priority Data

Jun. 27, 2017 (NZ) .................................... 733302

(51) Int. Cl.
*B27K 3/16* (2006.01)
*B27K 3/32* (2006.01)
(Continued)

(52) U.S. Cl.
CPC ............. *B27K 3/52* (2013.01); *B27K 3/007* (2013.01); *B27K 3/0228* (2013.01);
(Continued)

(58) Field of Classification Search
CPC ....... B27K 2240/30; B27K 3/22; C08L 97/02; C09K 21/02
See application file for complete search history.

(56) References Cited

U.S. PATENT DOCUMENTS

| 2003/0118810 A1 | 6/2003 | Grantham et al. |
| 2004/0091549 A1 | 5/2004 | Forrester |

(Continued)

FOREIGN PATENT DOCUMENTS

| CA | 2234130 | 12/1998 |
| JP | S62144902 | 6/1987 |

(Continued)

OTHER PUBLICATIONS

International Search Report received in PCT/NZ2018/050092, dated Sep. 2, 2018, 7 pages.

(Continued)

*Primary Examiner* — Alexander M Weddle
(74) *Attorney, Agent, or Firm* — Arc IP Law, PC; Joseph J. Mayo

(57) ABSTRACT

A treatment process and wood products thereof including a product formulation of a single phase solution combining a wood preservative (durable component) with a Flame Retardant component (FR) to produce a durable Flame Retardant (dFR) treated wood product. The durable component comprises a range of copper based and non-copper based wood preservatives, while the FR component comprises alkali metal silicates and alkali metal aluminate compounds. The dFR working solution undergoes chemical impregnation (treatment) followed by a heat (fixation) process step that locks the chemical into the wood making it non-leachable. The dFR treated wood products are tested for their enhanced fire performance properties. When heated, wood undergoes thermal degradation and combustion producing gases, vapors, tars and chars. Using a cone calorimeter burn test (Continued)

method, dFR treated wood products show a significant reduction in heat release rate, mass loss rate and smoke generated values compared to untreated radiate pine.

19 Claims, 3 Drawing Sheets

(51) Int. Cl.
| | |
|---|---|
| B27K 3/52 | (2006.01) |
| B27K 3/00 | (2006.01) |
| B27K 3/02 | (2006.01) |
| B27K 3/08 | (2006.01) |
| B27K 3/18 | (2006.01) |
| B27K 3/20 | (2006.01) |
| B27K 3/22 | (2006.01) |
| B27K 3/26 | (2006.01) |
| B27K 3/28 | (2006.01) |

(52) U.S. Cl.
CPC .............. *B27K 3/0285* (2013.01); *B27K 3/08* (2013.01); *B27K 3/32* (2013.01); *B27K 3/18* (2013.01); *B27K 3/20* (2013.01); *B27K 3/22* (2013.01); *B27K 3/26* (2013.01); *B27K 3/28* (2013.01); *B27K 2240/20* (2013.01); *B27K 2240/30* (2013.01)

(56) References Cited

U.S. PATENT DOCUMENTS

| | | |
|---|---|---|
| 2007/0082187 A1 | 4/2007 | Wang et al. |
| 2008/0069978 A1 | 3/2008 | Lenox et al. |
| 2009/0133847 A1 | 5/2009 | Slimak et al. |
| 2010/0062276 A1 | 3/2010 | Rhijn |
| 2017/0226424 A1 | 8/2017 | Moon |

FOREIGN PATENT DOCUMENTS

| | | | |
|---|---|---|---|
| JP | 2000108108 | 4/2000 | |
| WO | 2005094586 | 10/2005 | |
| WO | 2012072592 | 6/2012 | |
| WO | 2016022032 | 2/2016 | |
| WO | WO-2016022032 A2 * | 2/2016 | ............... B27K 3/02 |

OTHER PUBLICATIONS

International Preliminary Report on Patentability received in PCT/NZ2018/050092, dated Dec. 31, 2019, 11 pages.
Ximenes, Fabiano A., et al., "Protection of wood using oxy-aluminium compounds", *Forest Products Journal* (2006) vol. 56, No. 11/12, pp. 116-122.
Sulaiman, O., et al. "Effect of Incorporation of Flame Retardants on Some of the Properties of Phenol Formaldehyde Medium Density Fiberboard", International Journal of Agricultural Research (2008), vol. 3, No. 5, pp. 331-339.
Xing. D & Li. J., "Effects of Heat Treatment on Thermal Decomposition & Combustion Performance of Larix spp. Wood", BioResources, (2014), 14 pages.
Lowden L.A. & Hull T.R. "Flammability behaviour of wood & a review of the methods for its reduction", Fire Science Reviews (2013).
Marney D.C.O, Russell L.J., Mann R. "Fire Performance of Wood (*Pinus radiata*) treated with Fire Retardants & a Wood Preservative", Wiley InterScience (2008), 14 pages.
Hugget, c., "Estimation of Rate of Heat Release by Means of Oxygen Consumption Measurements", Fire and Materials, 4, pp. 61-65, (1980).
Fang, J.B. Wood Fire Behaviour & Fire Retardant Treatment: Canadian Wood Council, Ottawa, Canada (1966).
Holmes, C.A "Effect of Fire-Retardant Treatments on Performance Properties of Wood", Forest Products Laboratory (1977), 25 pages.
Sweet, M.S., LeVan, S.L., Tran, H.C., & DeGroot, R.C. "Fire performance of wood treated with combination fire-retardant and preservative systems", United States Department of Agriculture—Forest Products Laboratory (1996), 12 pages.
Peng, Y, Yousoo, H, Gardner, D.J. "Sodium Silicate coated wood", Proceedings of the International Convention of Society of Wood Science and Technology and United Nations Economic Commission for Europe—Timber Committee (2010), 9 pages.
Babrauskas, V. and Grayson, SJ, "Heat Release in Fires", Elsevier Applied Science, London: (1992).
Moghtaderi, B., "Combustion Characteristics of Solid Fuels Under Fire Conditions", PhD Thesis, The University of Sydney, Australia, (1996), 11 pages.
Rowell, R. M "Handbook of Wood Chemistry & Wood Composites" 2nd Edition (2012), 41 pages.
Australian Standard AS1604.1, "Specification for Preservative Treatment Part 1: Sawn & Round Timber" Standards Australia: Sydney, NSW, Australia (2005), 10 pages.
Soja, E., "The use of the cone calorimeter for determining the hazard of building material & contents in fire" BRANZ Study Report (No. 63-1995.), 44 pages.
Australian Standard AS3959-2009, "Construction of buildings in bushfire-prone areas". Standards Australia: Sydney, NSW, Australia (2009), 11 pages.
Australian Standard AS/NZS3837 "Method of test for heat and smoke release rates for materials & products using oxygen consumption calorimeter" Standards Australia/Standards NZ Sydney, NSW, Australia & Wellington, NZ (1998), 8 pages.
Forest Wood Products Australia (FWPA) Australia Outdoor Timber & Infrastructure Market (Project No. PRA213-1011, Apr. 2011), 16 pages.
Forest & Wood Products Research & Development Corporation (FWPRDC) "Combining fire retardant & preservative systems for timber products in exposed applications—state of the art review" (Project No. PN04.2007]. (Jun. 2004), 40 pages.
ASTM D2898. "Standard Test Method for Accelerated Weathering of Fire-Retardant treated wood for Fire-Testing". ASTM International: West Conshohochen, PA. (1981).
White, Robert, "Accelerated Weathering of Fire-Retardant-Treated Wood for Fire Testing", Recent Advances in Flame Retardancy of Polymeric Materials, U.S. Forest Services Forest Products Laboratory (2009), 12 pages.

* cited by examiner

ENHANCED PERFORMANCE OF WOOD AND ENGINEERED WOOD PRODUCTS USING COMBINED DURABILITY AND FLAME RETARDANCY

CROSS-REFERENCE TO RELATED APPLICATIONS

This application is a Continuation of U.S. Utility patent application Ser. No. 16/626,703, filed on 26 Dec. 2019, which is a National Stage Patent Application Filing of PCT/NZ2018/050092, filed 27 Jun. 2018, which claims priority from New Zealand patent application number 733302, filed 27 Jun. 2017, the specifications of which are herein incorporated herein by reference.

BACKGROUND OF THE INVENTION

Field of the Invention

Described herein is an enhanced performance of wood and engineered wood products (EWP) using varying combinations of wood preservatives (durability) and flame retardants [FR]. More specifically, a treatment method or process and wood products thereof that utilise impregnation, spray, immersion and deluge systems or in varying combinations. The wood preservatives used consist of copper and non-copper based approved formulations and the flame retardants [FR] being based on alkali metal silicates, alkali metal aluminates and other chemical additives to achieve enhanced performance.

Description of the Related Art

Development in the area of treatment impregnation (wood modification) and other applied spray, immersion and deluge systems has increased significantly due to the demand and need to enhance the performance properties of untreated, treated (durable) and engineered wood products.

Current heat treatment and chemical treatment processes applied to most wood species fail to achieve and meet a combined level of durability (for both fungal decay and insect attack—mainly termites) and flame retardancy prescribed and required by certifiers and territorial authorities globally.

While conventional chemical treated timber (wood preservatives) involves the impregnation of lignocellulosic material such as wood and engineered wood products with chemical preservatives and other like compositions, using various vacuum and pressure cycles, which are generally limited to dry substrates in order to provide 'free space' to accommodate the additional fluid uptake 'working solution' requirements. It is in the addition of the combined Flame Retardant [FR] to the wood preservative in the form of a 'working solution' that is then impregnated into the wood that determines the effectiveness of the treatment penetration throughout the wood substrate.

The wood treatments must meet the required product penetration levels and retentions (i.e. loadings—kg's per $m^3$) outlined within the prevailing durability standards (for example H3, H4, H5). Fire Retardant [FR] penetrations and retentions are not prescriptive but rely on the product performance requirements for Bushfire (Australia) and Forest Fire applications.

From the above, it can be seen that there is a global opportunity for enhanced performance of wood and engineered wood products using combined durability and flame retardancy to cover all major treatment hazard classes in H3, H4, H5 (Australia) and the USA equivalents User Categories (UC-3, UC-4 and UC-5). The use of durable Flame Retardant [dFR] treated wood products that meet the Australian Standard (AS3959—Construction of buildings in Bushfire prone areas, exposed to BAL-29 and BAL-40) is large as it covers much of Australia's highly populated states and territories including; Victoria, New South Wales, South Australia, Australian Capital Territory (ACT) and Western Australia—most of Australia. Currently, wood and wood engineered products has had little presence in the Bushfire prone areas due to the limited availability of indigenous hardwoods and the inability to produce a durable Flame Retardant [dFR] treated product that meets the fire test standards.

The Australian Bushfire market size is approximately AU $400 million per annum and continues to grow with the expansion of "bushfire prone areas". The predominant use of radiata pine to manufacture the durable Flame retardant [dFR] treated wood products is ideally suited as resource (forests) are readily available in Australia, NZ and Chile. Radiata pine it is a regenerative product, relatively low cost and can be readily treated and processed using existing plant and equipment. Both the operating and capital costs to integrate into an existing treatment/wood processing operating is relatively low. The added value to producing a durable Flame Retardant treated wood product is multi-faceted in terms of providing value at the forest (feedstock), chemical manufacture, chemical treatment, wood processing and many more distribution and storage add-ons.

The application for durable Flame Retardant [dFR] wood products includes a wide of outdoor applications including; decking, fencing, structural bearers/joists, landscape and primed products including; weatherboards and trim boards. Also there is the application to provide durable Flame Retardant [dFR] treated wood products into higher retention applications such as fencing, posts and transmission poles and others The USA Forest fire market is in excess of US $1.5 billion per annum and continues to grow exponentially. Similarly, the USA Forest Fire market for the use of durable Flame Retardant [dFR] treated wood products that meets the relevant USA Standards and could be produced in the same way that the product is produced for the Australian Bushfire market, as the testing requirements are very similar.

With a durable Flame Retardant [dFR] treated wood and a durable Flame Retardant [dFR] or Flame Retardant [FR] thermally modified timber (TMT) it is the inorganic metal oxide component that provide increased fire retardancy to the treated wood.

For 'Impregnation Modification' to occur, the impregnant molecules (chemical(s) must be of a sufficiently small size by which to enter the cell wall (pore diameter less than 5 nm). As the wood swells the void volume ('micro-pores') in the cell wall increases which are then filled with liquid chemical(s) (called 'working solution') which fixes chemically via various reaction mechanisms.

From the above, it can be seen that there is a need for an enhanced performance of wood and engineered wood products (EWP) using varying combinations of wood preservatives (durability) and flame retardants [FR] or at least provides the public with a useful choice.

Further aspects and advantages of the treatment method or process and wood products thereof will become apparent from the ensuing description that is given by way of example only.

BRIEF SUMMARY OF THE INVENTION

Described herein is an enhanced performance of wood and engineered wood products using combined durability and flame retardancy that comprises several aspects. Firstly, in the product formulation to produce a durable Flame Retardant [dFR] single phase 'working solution' for chemical impregnation. Secondly, the wood impregnation treatment process and thirdly, the heat (fixation) process which ensures that the impregnated chemicals are firmly fixed into the wood structure.

In a first aspect there is provided a process of imparting enhanced durability and fire retardancy properties to lignocellulosic material comprising:

a wood preservative; and a flame retardant [FR], consisting of alkali metal silicates and/or alkali metal aluminates that utilises an impregnation treatment process and/or spray, immersion, deluge system such that there is chemical penetration into the cellular internal voids of the lignocellulosic material which becomes insoluble (fixed) on subsequent heating steps.

In a second aspect there is provided a lignocellulosic material product produced by the process of imparting enhanced durability and fire retardancy properties the lignocellulosic material comprising:

a wood preservative;

a flame retardant [FR], consisting of alkali metal silicates and/or alkali metal aluminates that utilises an impregnation treatment process and/or spray, immersion, deluge system such that there is chemical penetration into the cellular internal voids of the lignocellulosic material which becomes insoluble (fixed) on subsequent heating steps.

Advantages of the above include product formulations that combine wood preservatives (chemicals) and Flame Retardants [FR] that provide an enhanced durability and flame retardancy required in Bushfire and Forest Fire prone areas. Flame Retardancy [FR] on its own in outdoor applications has limited value without having the combined durability of fungal decay (rot) and insect attack (termites). Furthermore, the product formulations which include the flame retardants [FR] do not in any way impede or hinder the normal penetration and retention properties of the water borne wood preservatives when applied using the various treatment processes. Treatment using these formulations meets the appropriate industry standards for wood preservation. The advantage of this treatment process is that it incorporates a full impregnation step to achieve both durability and fire retardancy in the treated wood and engineered wood products. A further advantageous effect of this invention being that treated timber (to hazard classes H3, H4 and H5) can achieve a level of flame retardancy that will allow it to meet the Australian Bushfire (AS 3959-2009) and potentially the USA Forest Fire Standards. The treatment process is versatile as a large range of treated timbers can achieve durable Flame Retardants such as; radiata pine, pinus elloitti (slash pine), araucaria (hoop pine), douglas fir (oregon pine), pinus carribaea (yellow pine, yellow southern pine), cedar (western red cedar). Finally, the significance and impact of this invention is that the durable Flame Retardant [dFR] treated wood product is fully impregnated throughout the wood substrate making it acceptable for unpainted and painted treated wood products. Also, the fact that this durable Flame Retardant [dFR] uses a single homogenous 'working solution' that requires a single treatment and heat (fixation) process all of which are able to be achieved in an existing treatment plant is most advantageous.

BRIEF DESCRIPTION OF THE DRAWINGS

Further aspects of the enhanced performance of wood and engineered wood products (EWP) using varying combinations of wood preservatives (durability) and flame retardants [FR] will become apparent from the following description that is given by way of example only and with reference to the accompanying drawings in which.

DETAILED DESCRIPTION OF THE INVENTION

Figure 1:
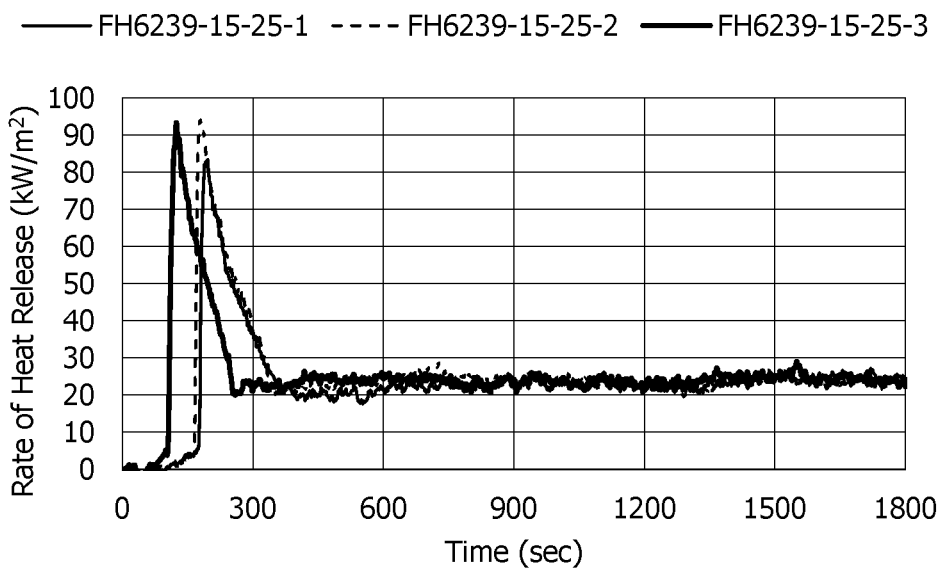
FIG. 1 illustrates HRR heat curves showing the peak and average HRR values over 1800 sec (30 min.). In particular, Heat Release Rate (HRR): durable Flame Retardant [dFR] treated wood samples (FH6239-15-25-1/2/3) after Post-Weathering Test (ASTM D2898 Method B modified) and Burn Test AS/NZS 3837.

As noted above, described herein is an enhanced performance of wood and engineered wood products using combined durability and flame retardancy that comprises several aspects. Firstly, in the product formulation to produce a durable Flame Retardant [dFR] single phase 'working solution' for chemical impregnation. Secondly, the wood impregnation treatment process and thirdly, the heat (fixation) process which ensures that the impregnated chemicals are firmly fixed into the wood structure.

For the purposes of this specification, the term 'about' or 'approximately' and grammatical variations thereof mean a quantity, level, degree, value, number, frequency, percentage, dimension, size, amount, weight or length that varies by as much as 30, 25, 20, 15, 10, 9, 8, 7, 6, 5, 4, 3, 2, or 1% to a reference quantity, level, degree, value, number, frequency, percentage, dimension, size, amount, weight or length.

The term 'substantially' or grammatical variations thereof refers to at least about 50%, for example 75%, 85%, 95% or 98%.

The term 'comprise' and grammatical variations thereof shall have an inclusive meaning—i.e. that it will be taken to mean an inclusion of not only the listed components it directly references, but also other non-specified components or elements.

The term 'durable Flame Retardant [dFR] treated wood product' or grammatical variations thereof refers the combination of a durable wood (chemical) preservative and a Flame Retardant impregnated into a wood substrate. A durable Flame Retardant [dFR] treated wood product has achieved a global first in meeting the Australian Standard (AS 3959-2009 for construction of buildings in bushfire-prone areas) to withstand exposures up to BAL-29 and BAL-40 conditions (Bushfire Attack Level).

The term 'enhanced durability' or grammatical variations thereof refer to resistance to or fungal decay, rot, insect attack, such as termites and the like.

In a first aspect there is provided a process of imparting enhanced durability and fire retardancy properties to lignocellulosic material comprising:

a wood preservative;

a flame retardant [FR], consisting of alkali metal silicates and/or alkali metal aluminates that utilises an impregnation treatment process and/or spray, immersion, deluge system such that there is chemical penetration into the cellular internal voids of the lignocellulosic material which becomes insoluble (fixed) on subsequent heating steps.

The product formulations may comprise a durable component and Flame Retardant component which may combine as a single phase soluble concentrate and should be understood to be termed "working solution" for chemical (treatment) impregnation. It is in the addition of the combined Flame Retardant [FR] to the wood preservative in the form of a 'working solution' that may be then impregnated into the wood or alternatively applied in conjunction with a sprayed, immersion or deluge systems.

The durable component may comprise a range of wood preservatives both copper based and non-copper based to control fungal decay and insect (termite) attack.

The Flame Retardant [FR] component may comprise of a range of inorganic metal oxides which impart Flame retardancy via various flame retardant mechanisms during fire combustion. Also, the product formulations may be used in conjunction with Thermally Modified Timber (TMT) and may be the same product formulations as used with untreated, treated wood and engineered wood products. Also, the same product formulations may be used as working solutions for treatment impregnation are the same as may be used for spray, immersion or deluge application systems.

In the case of chemical impregnation the combined wood preservatives and flame retardants [FR] may be impregnated into the wood substrate and further undergo a heat or drying process to achieve fixation (non-leaching).

The wood impregnation treatment process may use a wide range of different treatment process schedules which impart differing performance criteria. The standard conventional wood processing treatment schedules that may be used, but not be seen as limited to; Bethel, Lowry, Reuping or modified (low uptake) processes. The inventor has found that all of these processes may be capable of potentially achieving the required wood impregnation that meets the desired standards for penetration and retention for chemical durability and fire retardancy. The inventor has found that using chemical impregnation technology has allowed the facilitation of impregnating the cell wall with a single or combination of chemicals (wood preservative plus flame retardant), which become "fixed" into the cell wall of the wood. In the case of durable Flame Retardant [dFR] treated wood products, the modification is achieved through the addition of inorganic alkali metal oxide flame retardants to a water borne chemical preservatives (approved for use in H3, H4, H5, UC3A, UC3B, UC4 and UC5) followed via a heat (fixation) process.

As above, with a durable Flame Retardant [dFR] treated wood or Flame Retardant [FR] thermally modified timber (TMT), it is the inorganic metal oxide component that may provide increased fire retardancy to the modified wood.

Without being bound by theory, there are various reaction mechanisms that may occur depending on the type of flame retardant used; for example alkali metal silicates operate whereby the liquid soluble silicate monomer may impregnate into the wood voids (cell wall—lumena) as a monomer and on heating may undergo a condensation reaction (dehydration process) whereby unbound water may polymerise to produce a longer chain polymeric flame retardant (larger molecule) species. In the case of alkali metal aluminates, these may operate whereby the liquid (hydrated) stabilised aluminate may impregnate into the wood voids and on heating may undergo a dehydration process to produce an insoluble aluminate oxide.

This same chemical impregnation technology as above may also be applied to Thermally Modified Timber (TMT), where similarly the modification is achieved through the addition of inorganic alkali metal oxide flame retardant in isolation or in combination with chemical preservatives followed via the conventional thermal modification heat process (170-230° C.) to achieve chemical fixation.

The heat (fixation) process used may be required to fix the combined durable Flame Retardant [dFR] compounds into the wood or engineered wood products via a range of reaction mechanisms including but not limited to; dehydration, and/or polymerisation, etc. The heat energy sources may be; kilns, steam, hot air, and/or radio frequency.

The wood species for the above treatment process may include, but should not be seen as limited to; radiata pine, pinus elloitti (slash pine), araucaria (hoop pine), douglas fir (oregon pine), pinus carribaea (yellow pine, yellow southern pine), cedar (western red cedar).

The use of durable fire retardant [dFR] or flame retardant [FR] components can also be applied to other building construction systems requiring additional Fire Testing including; AS 5637.1:2015 & ISO 9705 (for internal Wall and Ceiling Linings), ISO 5660 (high rise buildings), AS/NZS 1530.8.1-2007 for fire testing of building materials, components and structures exposed to simulated bushfire attack e.g. BAL 40 and engineered wood products.

Technical Problem

The inventor has found to achieve a durable Flame Retardant [dFR] treated wood product, then three major areas of technical challenge must be identified and resolved.

The Product Formulations used to combine a durable (wood preservative) and a flame retardant (inorganic metal oxide) as [dFR] must achieve; solution stability (no solution phasing out, no solids deposition, low viscosity maintained, no gelification), single phase 'solution concentrate' that after repeated pressure-vacuum treatment cycles (charges) remains stable and not affected by soluble wood extractives, cellulose and lignin species.

The selection of wood preservatives used may be water based in both copper and non-copper active ingredients. The copper based wood preservatives are approved to H3, H4 and H5 hazard classes while the non-copper based are H3 approved only.

The Wood Impregnation Treatment Process may use a wide range of different treatment process schedules which impart differing performance criteria. As above, the standard conventional wood processing treatment schedules used including Bethel, Lowry, and Reuping all have inherent issues, hence the technical challenge of achieving a treatment schedule which after repeated pressure-vacuum treatment cycles (charges) remains stable and not effected by soluble wood extractives, cellulose and lignin species. The final durable Flame Retardant [dFR] treated wood must achieve the required chemical impregnation ('working solution' uptake—litres/m³) that meets the required standards for penetration and retention for chemical durability and fire retardancy.

The inventor has found that the Heat (Fixation) Process and the different reaction mechanisms required to achieve chemical fixation is critically important as potentially any un-fixed chemical will be solubilised and reduce the performance of both the durable and FR components of the formulation. In the case of alkali metal silicate Flame Retardants, the smaller size monomeric state of the soluble alkali silicate on heating (110/80° C.) polymerises to a larger species that is insoluble being both chemically and physically bound within the wood structure. In the case of alkali metal aluminate Flame Retardants, the soluble alkali aluminate on heating (90/70° C.) undergoes dehydration process to produce an insoluble metal aluminate oxide. The heat energy sources used may be kiln drying.

Solution to Problem

The inventor has unexpectedly found that for the Product Formulation, a wide range of water based wood preservatives in combinations with varying water soluble alkali metal oxide (Silicates and Aluminates) based flame retardants were formulated to achieve a stable homogenous durable Flame Retardant [dFR] working solutions.

Repeated (600-700) 'screening' tests of the various durable Flame Retardant [dFR] 'working solutions' were conducted using a "Venturi—Filtration Apparatus". This apparatus may create a vacuum filtration −70 to −80 kpa), whereby the working solutions are passed through a 1-5 micron (Qualitative Grade 1.Filter Paper), where the filtrate rates (measured in seconds/100 mls) of the treated flame retardant solutions are measured against the treated wood preservative (control) solutions. While this method may not replicate the wood impregnation process it provides an excellent method for 'pre-screening' the durable Flame Retardant [dFR] working solutions. Stability was measured using temperature (ambient to refrigerated, 30° C. to +3° C.), viscosity (digital viscometer), specific gravity (hydrometer), solids deposition (via filtration), colour change (visual), agitated and non-agitated over time (4-6 months). Once these working solution met all of the require working solubility criteria, they were taken to the next stage of wood impregnation process via a treatment plant.

For the Wood Impregnation Treatment Process semi-commercial scale treatment plants were used at SCION (Rotorua, NZ) and Koppers Performance Chemicals (Wiri, NZ). Chemical treatment could be carried out on long boards of 2.4 metre length, 150 mm wide, and 18 to 45 mm thickness covering virtually all commercial size products. Using the 'full cell' Bethel cycles during treatment impregnation process were able achieve uptakes ranging from 550 to 800 L/m³. However, uptake control in commercial plants is readily controllable, as these semi-commercial plant operate to time/volume. After treatment the returned working solution was tested for stability, viscosity, colour, solids, etc., and any other quality issues that may result from any potential "kickback" attributed to soluble wood extractives, cellulose and lignin species, however, there were none. Many repeated treatment charges were undertaken. Durable Flame Retardant [dFR] samples were tested for compliance with chemical penetration (for both wood preservative and flame retardant) and retention (for copper based wood preservatives only).

The Heat (fixation) Process used Heating Kilns (both large cross-flow and long horizontal kilns) to dry products on a semi-commercial scale at SCION (Rotorua, NZ). The board drying dimensions being; 2.4 metre length, 100-150 mm wide, and 18-45 mm thickness covering virtually all commercial sizes used.

In the case of alkali metal silicate Flame Retardants a heating temperature (110/80° C.) was used to polymerise and increase the molecular size whereby ensuring fixation has occurred resulting in non-leachable durable Flame Retardant [dFR] treated wood product. In the case of alkali metal aluminate Flame Retardants the soluble alkali aluminate on heating (90/70° C.) undergoes dehydration process to produce an insoluble metal aluminate oxide resulting in non-leachable durable Flame Retardant [dFR] treated wood product. The heat energy sources used are kiln drying.

The following below describes some preferred embodiments of the invention, in relationship to the durable Flame Retardant [dFR] product formulation, wood impregnation treatment process, heat (fixation) process and other applications of spray, immersion or deluge system to provide enhanced durability and flame retardancy performance of wood and engineered wood products. This invention is in no way limited to these embodiments as they are purely to exemplify the invention only and that possible variations and modifications would be readily apparent without departing from the scope of the invention.

The durable Flame Retardant [dFR] product formulation may consist of a durable component and a Flame Retardant [FR] component which may combine to produce a single combined formulation that is further impregnated into the wood and fixed via heat process producing a durable Flame Retardant [dFR] treated wood product.

The wood impregnation treatment process steps may further comprise:
a) Timber is loaded into the wood treatment chamber (can be cylindrical or square vessel), then sealed shut;
b) The chamber is then flooded under vacuum (−85 kPa) with the various 'working solutions', whereby allowing absorption (chemical uptake, Litres/m³) to occur;
c) Depending on the treatment process used i.e. Bethel, Lowry, Reuping or modified processes, then various pressures (1300-1500 kpa) and vacuum (−85 pka) cycles are applied for 30 to 180 minutes in order to achieve a targeted 'working solution' uptake varying from 400 to 800 litres per m³; and
d) Once the timber has been fully impregnated with the required amount of durable Flame Retardant [dFR], then it progresses to the next Heat (fixation) processing stage.

It should be appreciated by those skilled in the art that the operating parameters stated above are indicative only, and the full range of these operating parameters are outlined further below.

With regard to the Heat (fixation) process, once the treated flame retardant 'working solution' has been impregnated into the wood (via treatment process), then the wood may undergo a heat (fixation) treatment process based on time/temperature schedule. The time/temperature schedule is based on a time range of 24 to 84 hours and a temperature range (input/output) of 130 to 60° C. The time/temperature range parameters are very critical to optimise chemical fixation and not impair wood strength.

To evaluate and quantify the effectiveness of chemical fixation process, leachability tests (Leaching Test EN 84 Method) were conducted on both the wood preservative (dissolved Copper Azole—dCA) and Flame Retardant (alkali metal silicate). The depletion rate results are outlined in later Examples. Alkali metal aluminates chemical fixation was measured by chemical retentions calculated after post-weathering trials (ASTM D2898 method B) and for Flame Retardant measured by the actual burn test carried out (AS/NZS3837).

In a second aspect there is provided a lignocellulosic material product produced by the process of imparting enhanced durability and fire retardancy properties the lignocellulosic material comprising:

a wood preservative; and a flame retardant [FR], consisting of alkali metal silicates and/or alkali metal aluminates that utilises an impregnation treatment process and/or spray, immersion, deluge system such that there is chemical penetration into the cellular internal voids of the lignocellulosic material which becomes insoluble (fixed) on subsequent heating steps.

In the case of chemical impregnation of durable Flame Retardant [dFR] or just a Flame Retardant [FR] to Thermally Modified Timber [TMT]. After chemical impregnation the [dFR] or [FR] products are placed into a specific 'thermal modification heat kiln' where via a series of process steps reaches an elevated temperature of at least 190° C. and up to 250° C. at which point thermal modification has occurred. The final product being durable Flame Retardant Thermally modified Timber [dFR-TMT] and Flame Retardant Thermally Modified Timber [FR-TMT].

The embodiments described above may also be said broadly to consist in the parts, elements and features referred to or indicated in the specification of the application, individually or collectively, and any or all combinations of any two or more said parts, elements or features.

Further, where specific integers are mentioned herein which have known equivalents in the art to which the embodiments relate, such known equivalents are deemed to be incorporated herein as of individually set forth.

WORKING EXAMPLES

The above described enhanced performance of wood and engineered wood products (EWP) using varying combinations of wood preservatives (durability) and flame retardants [FR] are now described by reference to specific examples.

Example 1

Durable Flame Retardant Chemical formulation

The durable Flame Retardant [dFR] product formulation consists of a durable component and a Flame Retardant [FR] component which combine to produce a single phase formulation called "working solution" that is further impregnated into the wood and fixed via heat process producing a durable Flame Retardant [dFR] treated wood product. The durable and Flame Retardant components are outlined in below, as is Example 1 and 2 of product formulations.

The durable Flame Retardant chemical formulation comprises:

1. Durable component comprising of a range of wood preservatives used in the control of fungal decay, mould and insect attack (termites) attack. The range of wood preservatives extends to both copper and non-copper based formulations, the copper based formulations include; —Copper Chrome Arsenate (CCA), dissolved Copper Azoles (dCA), micronized Copper Azoles (mCA), Alkaline Copper Quaternary (ACQ), micronized Copper Quaternary (mCQ) and the non-copper based formulations include; water based azoles, tri-azoles including; propiconazole, tebuconazole, cyproconazole and carbamates including; iodopropynyl Butyl Carbamate (IPBC).

2. Flame retardant component comprising of a range of inorganic metal oxides which impart flame retardancy via differing flame retardant mechanisms during combustion (fire burning). The range of inorganic metal oxides includes soluble alkali metal silicates, such as sodium silicate (ortho, meta, di and tri-silicates), potassium silicate, lithium silicate and soluble alkali aluminates including sodium aluminate and potassium aluminate. The range of Flame Retardant [FR] inorganic metal oxides also extends to aluminium oxide nano-particles (dispersions), aluminium silicate nano-particles (dispersions) and silicon dioxide nano-particle dispersions.

To best understand the principles of the invention, the following additional working example are provided for illustrative purposes only.

Example 1A. Copper Based (Durable) Flame Retardant Formulation 28 g of sodium aluminate [$Na_2Al_2O_4$] is dissolved in a solution of 3 g of sodium gluconate (salt of gluconic acid) and 75 g of water to produce a clear and stabilised liquid sodium aluminate solution. Then 2 g dissolved copper azole (9% m/m—Copper, 0.5% m/m—azole) is added to the stabilised sodium aluminate solution to produce a durable Flame Retardant chemical formulation (working solution), as further outlined in Table 1. below:

TABLE 1

Example of a durable Flame Retardant (working solution) below:

| Chemical Ingredients | % Content | Actual Content |
| --- | --- | --- |
| Sodium Aluminate [SA] | 28% | 28 g |
| *Salt of gluconic acid - sodium gluconate | 3% | 3 g |
| Copper azole (soluble copper azole) | 2% | 2 g |
| Balance water | 67% | Balance water |
| Total | 100% | 100 ml |

*Stabiliser agent is salt of gluconic acid (sodium gluconate)

Example 1B. Non-Copper Based (Durable) Flame Retardant Formulation 12.5 g of soluble sodium silicate [40%—$Na_2SiO_3$] is dissolved in a solution of 2 g of water based azoles (Aquazole—PTPm) and 75 g of water to produce a milky coloured emulsion. The durable Flame Retardant chemical formulation (working solution), as further outlined in Table 2. below:

TABLE 2

Example of a durable Flame Retardant (working solution) below:

| Chemical Ingredients | % Content | Actual Content |
|---|---|---|
| Sodium Silicate [SSi] | 5% | 12.5 g |
| Water Based Azoles (*Aquazole - 20% Azoles) | 2% | 2 g |
| Balance water | 93% | Balance water |
| Total | 100% | 100 ml |

*Aquazole [PTPm]: 10% Propiconazole-[P], 10% Tebuconazole-[T], 5% Permethrin[Pm]

3. The use of aluminium oxide [$Al_2O_3$] nano-particles (dispersions), aluminium silicate [$Al_2O_3.SiO_2$] nano-particles (dispersions) and silicon dioxide [$SiO_2$] nano-particle dispersions as flame retardants components in both water and solvent systems. The nano-particle dispersions are suspensions of aluminium oxide [$Al_2O_3$], aluminium silicate [$Al_2O_3.SiO_2$] and silicon dioxide [$SiO_2$] in water or in various organic solvents such as ethanol or mineral oil and typically range in size of 10-200 nm (nano-metres). The range of organic solvents that can be used with these nano-particle dispersions includes; ethanol, mineral oils and others including high and low aromatic hydrocarbons and glycols (ethylene and propylene).
4. The use of durable fire retardant [dFR] or flame retardant [FR] components in resin systems such as glue-line additives (GLA), laminates or compressed. Phenolic resins include; phenol formaldehyde, urea formaldehyde, resorcinol, melamine urea formaldehyde. Resin system applications include; plywood, bamboo (laminated and compressed), particle board and Laminated Veneer Lumber (LVL).

Example 2

Wood Impregnation Treatment Process

The preservative treatment of wood by pressure methods is the preferred commercial approach as it achieves greater efficiency in controlling the conditions and effectiveness in terms of achieving more uniform, deeper penetration and greater absorption of the working solution. The treatment plant has a door either at one or both ends to receive the untreated wood (charge), which is then loaded into the vessel ready for the treatment to occur. The plant has various accessory equipment in known fashion such as working tanks, flood lines, controls, vacuum and pressure pumps to deliver the various treating schedules.

There are two types of treatment pressure methods; firstly "empty cell process" where compressed air is applied to the timber prior to the wood preservative "working solution" is applied. The wood preservative is added to the vessel from an equalising tank where the air interchanges with the preservative. By trapping the air in the cells and releasing the pressure after treatment, the trapped air expands and forces the preservative out, with a final vacuum to remove any further solution. This process leaves no preservative in cell lumens and recovers much of the preservative used.

The 'full cell process" uses an initial vacuum removing much of air from the cells, thereby removing the air cushion which resists preservative penetration. This process achieves the maximum retention of the chemical preservative in the treatment of the wood.

There is also "modified full-cell process" which is basically the same as the "full-cell process" except that it uses lower levels of initial vacuum and often uses an extended final vacuum.

Modified full-cell process is the most commonly used method of treating wood with waterborne preservatives.

In wood treatment being 'Fit for Purpose' is critical and the various hazard classes or user categories (H3, H4, H5, or UC3B, UC4B) must meet compliance through penetration and retention. Both penetration and retention are a function of the treatment process, hence the importance of the correct treatment schedule for the appropriate wood species, grade and size.

The treatment carried out using the durable Flame Retardant [dCA] can be achieved via 'full cell process', 'modified full cell process' and low uptake process' to achieve compliance in terms of penetration and retention. To achieve the required durability loading (for H3 dCA) and sufficient loading of Flame Retardancy [FR—$kg/m^3$] needed to meet the heat testing criteria specified by the Australian Bushfire Standard (AS3959-2009) and the USA 'Spread of Flames' testing requirements.

Using non-structural grade (decking) and structural (mgp-10) grade (bearers) radiata pine, which is fully impregnated using a 'full cell process' generates the following chemical uptakes (of working solution) and retentions for both copper [H3ca] and Flame Retardant [FR] as outlined in Table 3:

TABLE 3

Impregnation Treatment data for chemical treatment using durable Flame Retardant [dFR – H3ca + alkali metal aluminate] working solution and showing Chemical Uptake ($L/m^3$) and Retention ($kg/m^3$)
Chemical Impregnation Charges

| Sample | Wood Type | Board Dimensions | Chemical Uptake | Chemical Retention ($kg/m^3$) | |
|---|---|---|---|---|---|
| | | | | *Copper | Flame Retardant |
| H3caFx-DA | Decking | 2.4 m × 100 × 22 mm | 656 $L/m^3$ | 1.40 | 26.2 |
| H3caFx-DB | Decking | 2.4 m × 100 × 22 mm | 715 $L/m^3$ | 1.52 | 28.6 |
| H3caFx-DC | Decking | 2.4 m × 100 × 22 mm | 753 $L/m^3$ | 1.60 | 41.4 |
| H3caFx-DD | Decking | 2.4 m × 100 × 22 mm | 728 $L/m^3$ | 1.55 | 40.0 |
| H3caFx-DE | Decking | 2.4 m × 100 × 22 mm | 712 $L/m^3$ | 1.52 | 28.5 |
| H3caFx-DF | Decking | 2.4 m × 100 × 22 mm | 759 $L/m^3$ | 1.62 | 41.7 |
| H3caFx-DG | Decking | 2.4 m × 100 × 22 mm | 582 $L/m^3$ | 1.24 | 40.7 |
| H3caFx-DH | Decking | 2.4 m × 100 × 45 mm | 587 $L/m^3$ | 1.25 | 41.1 |

TABLE 3-continued

Impregnation Treatment data for chemical treatment using durable Flame
Retardant [dFR – H3ca + alkali metal aluminate] working solution
and showing Chemical Uptake (L/m³) and Retention (kg/m³)
Chemical Impregnation Charges

| Sample | Wood Type | Board Dimensions | Chemical Uptake | Chemical Retention (kg/m³) | |
|---|---|---|---|---|---|
| | | | | *Copper | Flame Retardant |
| H3caFx-SA | Structural | 2.4 m × 100 × 45 mm | 811 L/m³ | 1.73 | 44.6 |
| H3caFx-SB | Structural | 2.4 m × 100 × 45 mm | 719 L/m³ | 1.53 | 39.6 |
| H3caFx-SC | Structural | 2.4 m × 100 × 45 mm | 687 L/m³ | 1.46 | 48.1 |

*Copper H3 retention target 1.1 kg/m³

Based on these chemical uptakes (L/m³) for both the 22 mm and 45 mm thickness all of the durable component—dissolved Copper Azole [dCA] for H3 hazard class meets the required retention of 1.1 kg/m³ (equivalently if based on a wood density range of 440 to 480 kg/m³ the retention becomes 0.025% to 0.023% m/m Copper). Using lower uptake processes the durable Flame Retardant [dFR] 'working solution' increases to achieve similar or higher retentions as required. Similarly the uptakes for the Flame Retardant [FR] in this case an alkali metal oxide can be increased to meet the required Flame Retardancy. Also higher durable component hazard classes can be used i.e. H4 and H5, whereby increased loadings in the case of soluble copper azole, the loading of H4 increases to 2.0 kg/m³ (0.42% m/m-Cu), H5 increases to 3.6 kg/m³ (0.76% m/m-Cu), however the FR loadings remain the same.

Example 3

Heat (Fixation) Process

Once the treated flame retardant timber has been treated it has a high moisture content (% mc) in the range 60-200% which requires drying to bring it below 18% mc for resale. It is in the drying process where various kiln schedules are used in the control of temperature (set points), air flow (fans) and relative humidity at pre-determined times. The kiln schedules require temperature range for inlet temperature (wet bulb) to be 60-90° C. and the outlet temperature (dry bulb) to be 90-130° C. The time/temperature schedule is based on a time range of 24 to 84 hours and a temperature range (input/output) of 130 to 60° C. The time/temperature range parameters are very critical to optimise chemical fixation and not impair wood strength. Other heat sources can potentially be used like steaming, radio frequency and microwave technology.

In the case of durable Flame Retardant [dFR]-alkali metal silicates [FR] the heat (fixation) process achieves two important processes in firstly reducing the moisture content (<18% mc) and secondly provides the energy to activate the condensation reaction mechanism (dehydration process) whereby the unbounded water molecules in the flame retardant (silicate ions) undergo polymerisation (or partial polymerisation) to produce a larger and bound molecules within the wood cells. The fixation process is supported and validated by the leaching test (Leaching Test EN 84 Method) for both the soluble copper azole and flame retardant (alkali metal silicates), as outlined in Table 4 and 5.

In the case of durable Flame Retardant [dFR]-alkali metal aluminates [FR] the heat (fixation) process (90/70° C.) similarly achieves two important processes in firstly reducing the moisture content (<18% mc) and secondly undergoes dehydration process to produce an insoluble metal aluminate oxide resulting in non-leachable durable Flame Retardant [dFR] treated wood product. The fixation process of alkali metal aluminates is supported and validated by chemical retentions calculated after post-weathering trials (ASTM D2898 method B) and for Flame Retardant measured by the actual burn test carried out (AS/NZS3837), refer to Table 6.

To evaluate and quantify the effectiveness of chemical fixation process, leachability tests (Leaching Test EN 84 Method) were conducted on both the wood preservative (dissolved Copper Azole—dCA) and Flame Retardant (alkali metal silicate). The depletion rate results are outlined in Example 3. Heat (Fixation) process Tables 4 and 5. Alkali metal aluminates chemical fixation was measured by chemical retentions calculated after post-weathering trials (ASTM D2898 method B) and for Flame Retardant measured by the actual burn test carried out (AS/NZS3837), refer Table 6.

TABLE 4

Leaching (Fixation): durable Flame Retardant [dFR] with
alkali metal silicate shows Copper (wood preservative, pCu) Loss
(depletion) Rate from leaching test method EN84 for radiata pine.

| | Sample #4 | Sample #6 | Sample #14 | Average |
|---|---|---|---|---|
| Day 1 | 0.43% | 0.47% | 0.54% | 0.48% |
| Day 8 | 0.43% | 0.37% | 0.29% | 0.36% |
| Day 14 | 0.15% | 0.18% | 0.16% | 0.16% |

The leaching (leachate solutions) results (samples 4, 6, 14) for copper in the durable Flame Retardant (for alkali metal silicates) gives an average gradient drop-off rates of 24% at day 1 (0.48%) to day 8 (0.36%) and 55% drop-off from day 8 (0.36%) to day 14 (0.16%). This copper [Cu] depletion rate is well within an acceptable level to maintain wood durability for the required hazard classes.

The fixation process for treated wood preservatives such as these copper based fungicides is well documented.

TABLE 5

Leaching (Fixation): Flame Retardant (FR) Loss Rate
(leaching test method EN84) for radiata pine.

| | Sample #4 | Sample #6 | Sample #14 | Average |
|---|---|---|---|---|
| Day 1 | 1.6% | 1.9% | 1.0% | 1.5% |
| Day 8 | 1.1% | 1.0% | 0.9% | 1.0% |
| Day 14 | 0.8% | 0.9% | 0.8% | 0.83% |

The leaching (leachate solutions) results (samples 4, 6, 14) for Flame Retardant [FR] (for alkali metal silicates) gives an average gradient drop-off rates of 33% at day 1 (1.5%) to day 8 (1.0%) and 17% drop-off from day 8 (1.0%) to day 14 (0.83%). This Flame Retardant [FR] depletion rate is well within an acceptable level to maintain a high level of Flame Retardancy required to contain fire combustion.

LEACHING TEST EN84 METHOD. Leaching Test samples were conditioned in the same way as it had been done before impregnation (65% RH and 20° C. till equilibrium moisture content). Leaching was done according to EN84. Samples were covered with deionized water in an amount of approximately five times the volume of the sample and placed in the impregnation vessel. Samples were held in 0.04 bar of vacuum for 20 min. After vacuum, the samples stayed in the water for 2 hr before the water was changed for the first time. Specimens were submersed in deionized water for 14 days. From every sample's vessel, 5 ml of leaching water was collected, combined and submitted for chemical analyses. Water changes and collecting of water samples were done ten times.

TABLE 6

Post - Weathering Chemical Retentions - Copper [Cu] and Flame Retardants [FR] for Alkali Metal Aluminates
Post - weathering chemical retentions - Copper [Cu] and FR Results

| Test Samples | Chemical Uptake - $L/m^3$ | Copper [Cu] - $kg/m^3$ | Flame Retardant [FR] - $kg/m^3$ | *Target [Cu] (H3) - $kg/m^3$ |
|---|---|---|---|---|
| 1-HcuFx-WD | 759 | 1.61 | 41.7 | 1.10 |
| 2-HcuFx-WA | 711 | 1.51 | 39.1 | 1.10 |
| 3-HcuFx-WC | 703 | 1.50 | 38.7 | 1.10 |
| 4-HcuFx-WC | 753 | 1.60 | 41.4 | 1.10 |
| 5-HcuFx-WB | 728 | 1.55 | 40.0 | 1.10 |
| 6-HcuFx-WC | 690 | 1.47 | 38.0 | 1.10 |
| 7-HcuFx-WB | 680 | 1.45 | 37.4 | 1.10 |
| 8-HcuFx-WA | 587 | 1.25 | 32.3 | 1.10 |
| 9-HcuFx-WA | 582 | 1.24 | 32.0 | 1.10 |
| 10-HcuFx-WB | 550 | 1.17 | 30.3 | 1.10 |

*Australian Standard AS1604.1-2012 for Penetration and Retentions

Leaching (Fixation): The chemical leaching results were achieved after the accelerated weathering tests [this is in accordance with AS 3959-2009, accelerated weathering test method ASTM D2898 method B, with water flow rate modified to ASTM D2898 Method A]. The Post-Weathering Chemical Retentions for Copper [Cu] and Flame Retardant [FR-alkali metal aluminate]—refer to Table 6.

Figure 4:
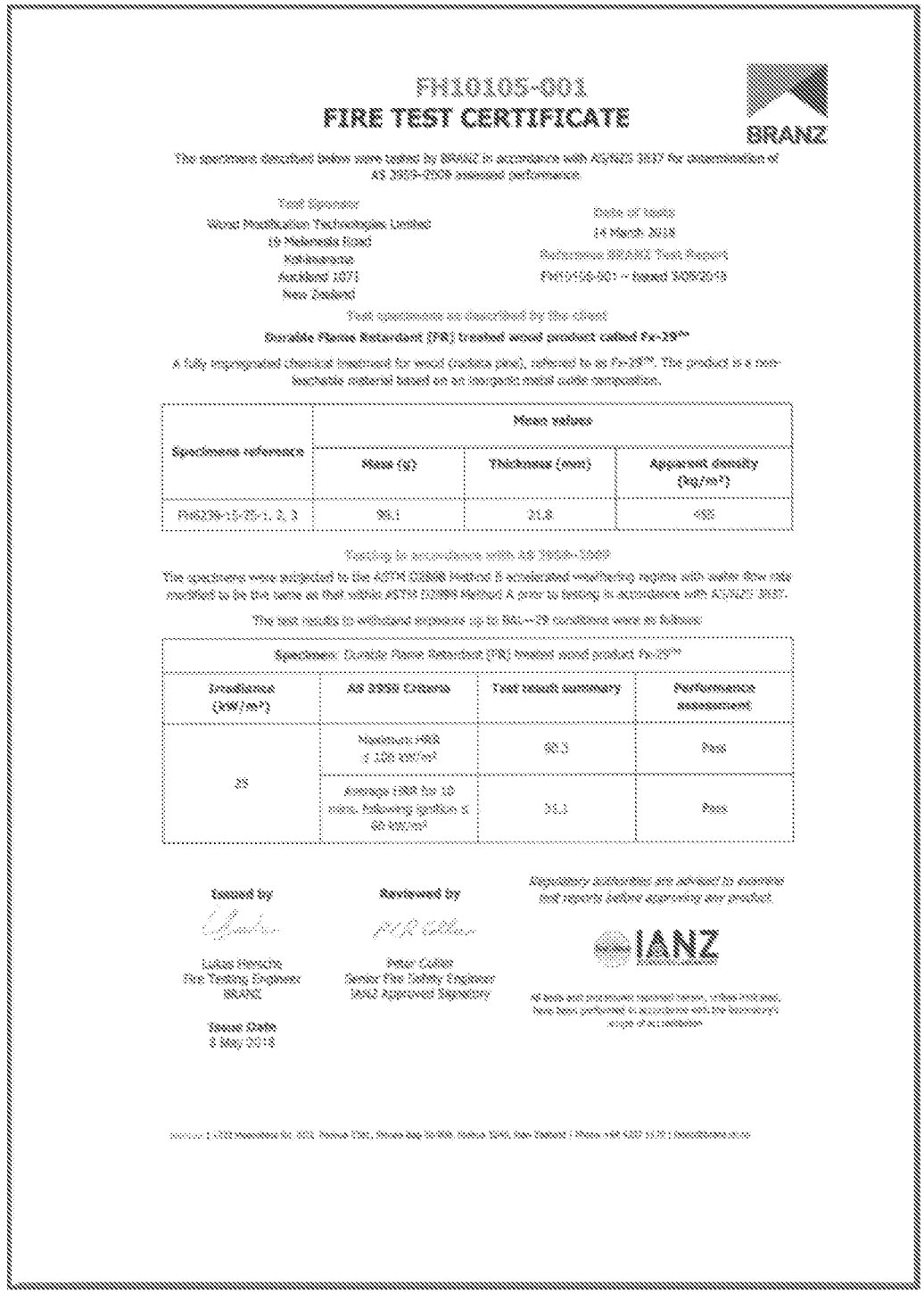
FIG. 4 illustrates a Fire Test Certificate (BRANZ Reference FH10105-001).

The copper [Cu] and Flame Retardant [RF] retentions post-weathering achieve the targeted retention levels for copper [H3] and the Flame Retardant [FR] retentions as those required to meet the subsequent burn tests [AS/NZ S 3837] required under the Australian Bushfire test in accordance with AS 3959 for construction in bushfire-prone areas to withstand exposures up to BAL-29 condition. Refer to FIG. 4—Fire Test Certificate (FH10105-001). The Fire Test Certificate is a global first for achieving a pass for the use of a "Durable Flame Retardant [FR] treated wood product".

Reaction Mechanisms—Alkali Metal Aluminates and Alkali Metal Silicates

Alkali Metal Aluminates:
Example: $Na_2Al_2O_4$ (solid)
or hydrated as soluble $2NaAl(OH)_4$+ heat (90/70° C.)=$Al_2O_3$ (insoluble)+$Na_2O$ Alkali Metal Silicates:
Example: $Na_2SiO_3$ (solid)
or hydrated as soluble $Na_2O$: $SiO_2$+ heat (120/80° C.)=$SiO_2$ (insoluble)+$Na_2O$ Example 4

Heat Release Rate (HRR)
Under the Australian Bushfire Standard AS 3959-2009—for construction of buildings in bushfire-prone areas, it specifies the following:

Appendix F for Bushfire-Resisting Timber (Normative)

F1 GENERAL—Bushfire-resisting timber that is solid, laminated or reconstituted form and is deemed to be acceptable to withstand exposure up to BAL-29 condition. Timber may be 'bushfire-resisting' by means of one or more of—(a) the inherent properties of the material itself; (b) being impregnated with fire-retardant chemicals; or (c) the application of fire-resistant coatings or substrates.

F2 TESTING The following applies: (a) to satisfy the requirements for bushfire-resisting timber, timber shall be tested in accordance with AS/NZS 3837 and shall meet the following criteria:
 (i) the maximum heat release rate shall be not greater than 100 $kW/m^2$
 (ii) the average heat release rate for 10 min. following ignition shall be not greater than 60 $kW/m^2$ when the material is exposed to an irradiance level of 25 $kW/m^2$.

F3 ACCELERATED WEATHERING Where accelerated weathering is required before testing to AS/NZS 3837, external fire-retardant-coated substrates shall be subjected to the ASTM D2898 Method B weathering regime, with the water flow rate modified to be the same as that within ASTM D2898 Method A.

The key determinant to meet the Australian Bushfire Standard (AS3959) is achieving the required peak Heat Release Rate (HRR) and average HRR values as outlined under Appendix F. Heat release rate (HRR) is the rate of heat generation by fire, measured typically $kW/m^2$.

The cone calorimeter (located at Branz) will evaluate fire performance properties such as heat release rate (HRR), fire degradation, time to ignition (Tg), mass loss rate (MLR) and smoke (SEA) Smoke Extinction Area that calculates the extent of smoke generated during combustion.

TABLE 7

Figure 2:
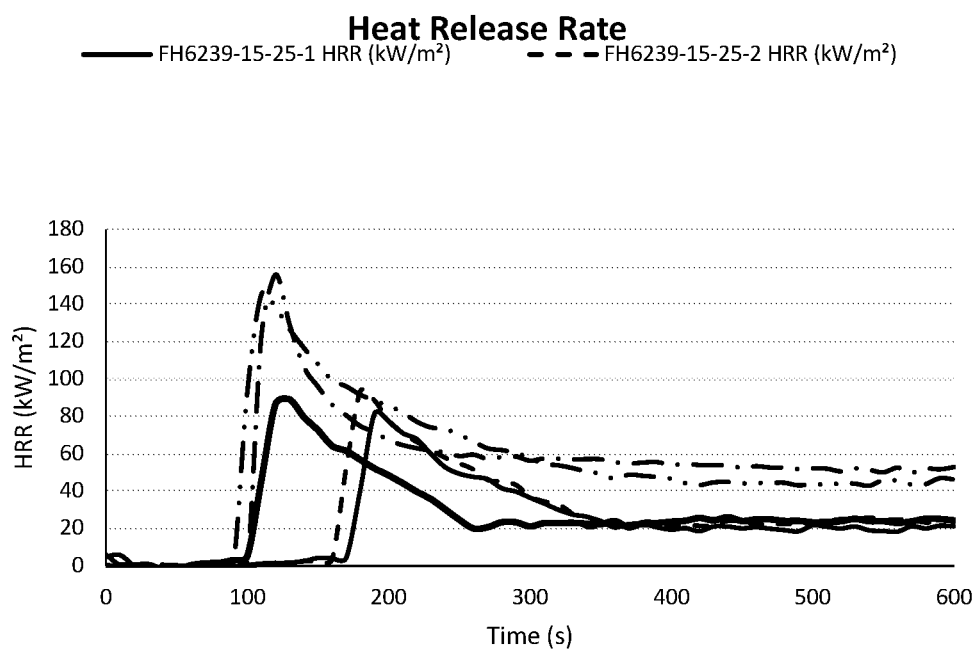
FIG. 2 illustrates The HRR heat curves showing the peak and average HRR values over 600 sec (10 min.) versus untreated wood. In particular, Heat Release Rate (HRR): durable Flame Retardant treated wood samples (FH6239-15-25-1/2/3) after Post-Weathering versus Untreated wood samples for radiata pine.
Figure 3:
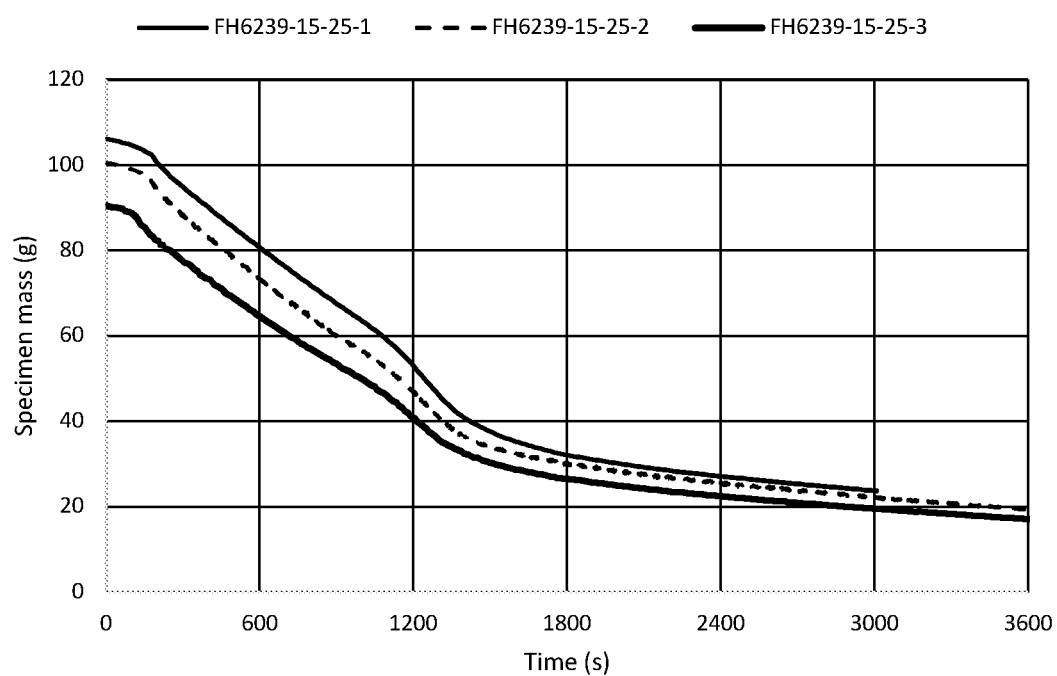
FIG. 3 illustrates the Mass Loss Rate (MLR): mass loss over the duration of the burn test for durable Flame Retardant [dFR] treated wood samples FH6239-15-25-1, 2, and 3 (all completed post-weathering test ASTM D2898) for radiata pine.

Heat Release Rate (HRR) and Mass loss (MLR): for durable Flame Retardant [dFR] alkali metal aluminates [FH6239-25-1/2/3] versus Untreated radiata pine samples [FH5777-25-2/3] - also refer FIGS. 1, 2 and 3.

| Time | FH6239-25-1 | | FH6239-25-2 | | FH6239-25-3 | | FH5777-25-2 | | FH5777-25-3 | |
|---|---|---|---|---|---|---|---|---|---|---|
| (s) | HRR | MASS | HRR | MASS | HRR | MASS | HRR | MASS | HRR | MASS |
| 0 | 0.51 | 106.10 | −0.94 | 100.50 | −0.84 | 90.60 | 4.97 | 207.10 | 6.01 | 84.20 |
| 10 | −0.47 | 106.18 | −2.18 | 100.46 | 0.12 | 90.31 | 5.81 | 206.65 | 0.46 | 83.91 |

TABLE 7-continued

Heat Release Rate (HRR) and Mass loss (MLR): for durable Flame Retardant [dFR] alkali metal aluminates [FH6239-25-1/2/3] versus Untreated radiata pine samples [FH5777-25-2/3] - also refer FIGS. 1, 2 and 3.

| Time | FH6239-25-1 | | FH6239-25-2 | | FH6239-25-3 | | FH5777-25-2 | | FH5777-25-3 | |
|---|---|---|---|---|---|---|---|---|---|---|
| (s) | HRR | MASS | HRR | MASS | HRR | MASS | HRR | MASS | HRR | MASS |
| 20 | −1.99 | 105.85 | −0.24 | 100.28 | 0.14 | 90.26 | 0.23 | 206.57 | 0.00 | 83.75 |
| 30 | −2.88 | 105.69 | 0.40 | 100.09 | 0.44 | 89.95 | 0.00 | 206.42 | 0.00 | 83.66 |
| 40 | −2.42 | 105.57 | −1.64 | 99.97 | −1.94 | 90.09 | 0.62 | 206.33 | 0.00 | 83.51 |
| 50 | −1.66 | 105.48 | −2.20 | 99.80 | −2.20 | 89.95 | 0.28 | 206.24 | 0.00 | 83.39 |
| 60 | −0.93 | 105.31 | 0.02 | 99.66 | 0.29 | 89.55 | 0.00 | 206.11 | 0.00 | 83.32 |
| 70 | −0.88 | 105.15 | 0.10 | 99.48 | 1.33 | 89.56 | 0.00 | 205.97 | 0.00 | 83.17 |
| 80 | 0.37 | 105.00 | −0.68 | 99.30 | 1.61 | 89.37 | 0.00 | 205.86 | 0.00 | 83.01 |
| 90 | −0.36 | 104.84 | 0.69 | 99.15 | 3.11 | 89.06 | 0.00 | 205.69 | 0.00 | 82.79 |
| 100 | 0.35 | 104.59 | 0.21 | 98.97 | 5.20 | 88.75 | 1.15 | 205.42 | 92.91 | 81.74 |
| 110 | 1.24 | 104.43 | 0.40 | 98.81 | 45.84 | 88.36 | 123.36 | 204.30 | 145.43 | 80.82 |
| 120 | 1.38 | 104.19 | 1.64 | 98.59 | 86.69 | 87.74 | 156.00 | 203.28 | 138.40 | 79.91 |
| 130 | 1.79 | 103.95 | 0.91 | 98.36 | 89.12 | 86.80 | 129.12 | 202.45 | 126.68 | 79.07 |
| 140 | 2.48 | 103.66 | 2.71 | 98.21 | 79.72 | 86.02 | 106.70 | 201.74 | 116.76 | 78.27 |
| 150 | 4.25 | 103.33 | 2.26 | 97.79 | 72.70 | 85.38 | 96.00 | 201.10 | 108.06 | 77.52 |
| 160 | 3.99 | 103.05 | 3.50 | 97.55 | 64.28 | 84.49 | 86.32 | 200.49 | 99.45 | 76.82 |
| 170 | 4.31 | 102.70 | 52.44 | 96.81 | 61.54 | 83.82 | 80.63 | 199.93 | 96.15 | 76.13 |
| 180 | 40.86 | 102.20 | 93.39 | 95.86 | 56.83 | 83.60 | 74.88 | 199.43 | 91.61 | 75.47 |
| 190 | 81.4 | 101.41 | 88.61 | 95.05 | 52.21 | 82.65 | 71.63 | 198.92 | 88.63 | 74.84 |
| 200 | 77.48 | 100.66 | 77.69 | 94.10 | 48.47 | 82.13 | 67.33 | 198.44 | 85.63 | 74.21 |
| 210 | 71.13 | 99.93 | 70.96 | 93.50 | 44.26 | 81.67 | 64.65 | 197.95 | 82.13 | 73.62 |
| 220 | 67.80 | 99.24 | 66.39 | 93.08 | 39.68 | 81.28 | 63.01 | 197.49 | 77.20 | 72.99 |
| 230 | 59.87 | 98.65 | 62.11 | 92.08 | 35.75 | 80.88 | 61.66 | 197.10 | 74.12 | 72.42 |
| 240 | 52.86 | 98.04 | 57.95 | 91.43 | 30.29 | 80.46 | 60.82 | 196.61 | 73.32 | 71.88 |
| 250 | 49.32 | 97.50 | 54.83 | 90.99 | 24.72 | 79.73 | 58.80 | 196.20 | 70.26 | 71.34 |
| 260 | 47.65 | 96.93 | 51.67 | 90.76 | 20.05 | 79.36 | 59.57 | 195.72 | 66.72 | 70.79 |
| 270 | 46.48 | 96.39 | 46.01 | 89.89 | 20.69 | 78.96 | 57.31 | 195.29 | 62.91 | 70.22 |
| 280 | 41.57 | 95.87 | 45.24 | 89.34 | 23.36 | 78.74 | 58.29 | 194.87 | 62.01 | 69.75 |
| 290 | 39.79 | 95.30 | 43.37 | 88.71 | 23.35 | 78.28 | 58.58 | 194.40 | 60.48 | 69.20 |
| 300 | 36.51 | 94.85 | 37.23 | 88.33 | 21.18 | 77.49 | 56.35 | 193.98 | 57.58 | 68.64 |
| 310 | 33.42 | 94.32 | 34.46 | 87.52 | 22.90 | 77.01 | 57.58 | 193.55 | 54.65 | 68.10 |
| 320 | 30.08 | 93.88 | 33.02 | 87.30 | 22.86 | 76.96 | 57.44 | 193.09 | 53.86 | 67.58 |
| 330 | 27.53 | 93.38 | 27.75 | 86.51 | 23.04 | 76.39 | 57.01 | 192.76 | 52.40 | 67.08 |
| 340 | 26.35 | 92.90 | 20.94 | 86.28 | 22.61 | 76.04 | 57.21 | 192.24 | 50.51 | 66.59 |
| 350 | 24.03 | 92.45 | 21.68 | 85.61 | 22.30 | 75.44 | 57.09 | 191.82 | 49.34 | 66.09 |
| 360 | 20.58 | 91.92 | 21.84 | 85.16 | 23.99 | 74.95 | 55.57 | 191.41 | 46.59 | 65.53 |
| 370 | 22.37 | 91.43 | 21.93 | 84.68 | 20.70 | 74.31 | 54.75 | 190.97 | 48.82 | 65.07 |
| 380 | 22.38 | 91.02 | 21.72 | 84.08 | 22.93 | 73.82 | 55.36 | 190.58 | 48.22 | 64.56 |
| 390 | 20.65 | 90.50 | 22.24 | 83.64 | 22.96 | 73.40 | 55.56 | 190.18 | 47.63 | 64.07 |
| 400 | 19.40 | 90.05 | 21.16 | 83.29 | 23.68 | 72.91 | 54.06 | 189.73 | 46.70 | 63.57 |
| 410 | 20.19 | 89.56 | 21.93 | 82.64 | 24.18 | 72.65 | 54.59 | 189.29 | 44.28 | 63.10 |
| 420 | 18.58 | 89.07 | 21.48 | 82.15 | 25.66 | 72.36 | 54.01 | 188.90 | 43.27 | 62.59 |
| 430 | 21.09 | 88.60 | 21.82 | 81.72 | 24.41 | 71.91 | 53.96 | 188.48 | 44.76 | 62.18 |
| 440 | 21.05 | 88.13 | 24.08 | 81.15 | 26.08 | 71.42 | 53.82 | 188.04 | 44.96 | 61.68 |
| 450 | 20.10 | 87.63 | 23.65 | 80.79 | 24.05 | 71.02 | 52.49 | 187.65 | 44.16 | 61.18 |
| 460 | 20.69 | 87.17 | 22.29 | 80.36 | 24.92 | 70.55 | 53.42 | 187.23 | 44.40 | 60.70 |
| 470 | 19.90 | 86.73 | 22.68 | 79.71 | 24.90 | 70.15 | 52.66 | 186.78 | 44.37 | 60.27 |
| 480 | 19.15 | 86.20 | 22.43 | 79.24 | 24.07 | 69.73 | 52.64 | 186.40 | 44.52 | 59.79 |
| 490 | 18.52 | 85.75 | 22.55 | 78.75 | 24.09 | 68.99 | 51.81 | 185.98 | 43.09 | 59.30 |
| 500 | 21.66 | 85.25 | 23.12 | 78.37 | 23.36 | 68.81 | 52.32 | 185.57 | 43.99 | 58.84 |
| 510 | 20.96 | 84.81 | 23.91 | 77.74 | 23.52 | 68.40 | 52.06 | 185.09 | 43.29 | 58.42 |
| 520 | 20.01 | 84.33 | 25.04 | 77.16 | 23.92 | 67.82 | 50.61 | 184.73 | 44.21 | 57.94 |
| 530 | 21.08 | 83.89 | 24.84 | 76.84 | 25.18 | 67.28 | 52.22 | 184.34 | 44.05 | 57.46 |
| 540 | 19.04 | 83.42 | 25.87 | 76.28 | 23.90 | 67.13 | 51.38 | 183.89 | 42.91 | 56.96 |
| 550 | 18.67 | 82.96 | 24.63 | 75.51 | 23.92 | 66.52 | 50.09 | 183.52 | 46.06 | 56.54 |
| 560 | 18.32 | 82.53 | 24.91 | 75.17 | 23.02 | 66.07 | 52.55 | 183.08 | 45.59 | 56.07 |
| 570 | 21.20 | 82.01 | 24.59 | 74.90 | 23.83 | 65.89 | 50.04 | 182.64 | 43.58 | 55.63 |
| 580 | 20.05 | 81.61 | 23.26 | 74.35 | 25.23 | 65.48 | 52.18 | 182.24 | 43.81 | 55.19 |
| 590 | 21.52 | 81.12 | 23.91 | 73.89 | 25.11 | 64.84 | 51.71 | 181.84 | 46.98 | 54.70 |
| 600 | 21.22 | 80.69 | 24.82 | 73.27 | 24.36 | 64.60 | 52.93 | 181.39 | 46.26 | 54.22 |

TABLE 8

Test Results
The Test Results from HRR (peak and average) and Flame Duration times

|  | FH6239-15-25-1 | FH6239-15-25-2 | FH6239-15-25-3 |
|---|---|---|---|
| *Peak HRR - KW/m$^2$ | 83.4 | 94.1 | 93.4 |
| *Average HRR - KW/m$^2$ | 29.1 | 32.7 | 31.6 |
| Time to Ignition - Tg | 178 sec | 166 sec | 108 sec |
| Time to Flameout | 352 sec | 348 sec | 248 sec |
| Flame Duration | 174 sec | 182 sec | 140 sec |

*peak and average HRR test results all pass.

The peak and average HRR test results post weathering and after the burn test pass the required HRR values of less than 100 kW/m$^2$ (for peak HRR) and less than 60 kW/m$^2$ (for average HRR) as outlined under the Australian Bushfire Standard (AS3959) Appendix F for bushfire-resisting timber.

The achievement of meeting the Bushfire Standard for exposure BAL-29, is the first time that a flame retardant wood product has achieved this milestone let alone a durable Flame Retardant [dFR] treated wood product achieving this milestone.

The HRR heat curves showing the peak and average HRR values over 1800 sec (30 min.) is outlined in FIG. 1. Heat Release Rate (HRR): durable Flame Retardant [dFR] treated wood samples (FH6239-15-25-1/2/3) after Post-Weathering Test (ASTM D2898 Method B modified) and Burn Test AS/NZS 3837. (Refer to Fire Test Certificate—FIG. 4)

The HRR heat curves showing the peak and average HRR values over 600 sec (10 min.) versus untreated wood is outlined in FIG. 2. Heat Release Rate (HRR): durable Flame Retardant treated wood samples (FH6239-15-25-1/2/3) after Post-Weathering versus Untreated wood samples for radiata pine—FIG. 2.

Burn Test—AS/NZS 3837 (cone calorimeter).

The post-weathering burn test is the most important of all the tests as it establishes the 2 key determinate peak and average HRR values that MUST be less than 100 Kw/m$^2$ (for peak HRR) and less than 60 kW/m$^2$ (for average HRR). All three results must be within a 10% arithmetic mean variance. The Time to Ignition (Tg) less the Flameout time gives the Flame duration which must be greater than 60 seconds otherwise the igniter is re-inserted.

Flame Retardant [FR] Reaction (Rx) Mechanism

The cone calorimeter test (AS/NZS 3837) used to measure combustion (HRR, Tg, SEA, etc.) for the various Flame Retardants impregnated into the wood, operates via varying Reaction (Rx) mechanisms. The main operating modes of action being; providing heat insulation to the wood, absorb the surrounding heat or increase the thermal conductivity of wood in order to dissipate the heat from the wood surface.

The alkali metal silicates [FR] on combustion follows a 'ceramification' reaction mechanism, whereby it creates an insulating blanket which at higher temperatures provides a radiation shield, delaying the volatilisation of the pyrolysis products and preventing heat from recirculating back into the wood. The alkali metal silicates have a high heat capacity ('ceramification') to contain heat within the wood substrate, however, as the heat builds up (at the higher temperatures) it gets to point at which energy (heat) is rapidly released producing elevated peak HRR values. After the peak HRR is reached there is a rapid decline in HRR, producing a low average HRR value.

The alkali metal aluminates [FR] on combustion follows a 'hydration' reaction mechanism, whereby hydrated soluble form alkali metal aluminate (e.g. $2NaAl(OH)_4$) acts as a chemical heat sink for the wood for the wood by absorbing some of the heat of combustion and lowering the temperature near the flame during endothermic decomposition and as a result, the wood is cooled and the time to ignition (Tg) is increased. The water vapour released from the hydrated alkali metal aluminate has the effect of diluting the combustion gases and toxic fumes. The decomposition endothermically releases 35% of its weight as water vapour which condenses (hydration process) and in process reduces the oxygen content of 21% down to 13%. The relationship of increasing the concentration of alkali metal aluminate via the hydration process directly reduces both peak HRR and the average HRR values.

Example 5

Mass Loss Rate (MLR)

The thermal decomposition behaviour of the mass loss and mass loss rate (MLR) reflects the combustion process and is related to the heat release (HRR) and smoke level generated (SEA). The first stage of mass loss curve is due to the elimination of moisture from the wood, while the second stage (charring) of thermal decomposition process mostly involves combustion of major wood components, including cellulose, hemicellulose and lignin. In achieving a successful pass during the cone calorimeter tests (AS/NZS 3837), the mass loss over the flame duration must exceed 150 g/s·m$^2$ over 60 seconds—refer to Table 9 below:

TABLE 9

Mass Loss (calc.) over the flame duration for the durable Flame Retardant [dFR] treated wood samples (FH6239-15-25-1/2/3).

| | Test Samples (AS3837 Burn test) | | |
|---|---|---|---|
| | FH6239-15-25-1 | FH6239-15-25-1 | FH6239-15-25-1 |
| Start weight | 106.1 g | 100.5 g | 90.6 g |
| Less final weight | 39.8 | 38.2 g | 34.5 g |
| Mass loss | 66.3 g (62.5%) | 62.3 g (62.0%) | 56.1 (62.0%) |
| Flame test duration (s, seconds) | 1558 s | 1454 s | 1400 s |
| Calc. Mass Loss = (g/s · m$^2$ × 60 sec | 66.3 g/1558 s = 4.26 g/s · m$^2$ × 60 s = 256 g/s · m$^2$ (60 s) | 62.3 g/1454 s = 4.28 g/s · m$^2$ × 60 s = 257 g/s · m$^2$ (60 s) | 56.1 g/1400 s = 4.01 g/s · m$^2$ × 60 s = 240 g/s · m$^2$ (60 s) |
| Mass loss exceeds | >150 g/s · m$^2$ (60 s) | >150 g/s · m$^2$ (60 s) | >150 g/s · m$^2$ (60 s) |

Example 6

Smoke Specific Extinction Area (SEA)

A convenient and basic measurement of smoke produced by a given material (e.g. wood) is the Smoke (Specific) Extinction Area (SEA), measured in $m^2/kg$. The relationship between heat release rate (HRR) and Smoke Extinction Area (SEA) is very important when relating to the influence and survival of humans (human safety) in a fire. With the Australian Bushfire Standard (AS 3959-2009) smoke generation is not a criteria for the success, however, with Forest Fires (USA) the smoke generation (measured) is a key criteria to meeting the fire standards. Included in this specification is reference to smoke generation (SEA) and the findings of durable Flame Retardant treated wood products versus untreated wood products.

The SEA value for untreated wood (radiata pine) has an average SEA value of 60 $m^2/kg$ compared to durable Flame Retardant [dFR] treated woods that have much lower average SEA values ranging from 1.4, 3.5, 12.0 (average 5.6 $m^2/kg$). Table 10 shows the impact of the Flame Retardant [FR] component within the durable Flame Retardant treated wood having a significant impact in not only lowering the heat release rate values, but also reducing the smoke release properties (SEA).

TABLE 10

Smoke (Specific) Extinction Area (SEA): durable Frame Retardant [dFR] treated wood products versus untreated wood (radiata pine).

| Products | Smoke (Specific) Extinction Area - SEA ($m^2/kg$) |
| --- | --- |
| Durable Flame Retardant [dFR] treated wood products (samples) | |
| FH6239-15-25-1. | 12.0 $m^2/kg$ |
| FH6239-15-25-2. | 3.5 $m^2/kg$ |
| FH6239-15-25-3. | 1.4 $m^2/kg$ |
| Total average of all 3 samples | 5.6 $m^2/kg$ |
| Untreated radiata pine | 60 $m^2/kg$ |

Aspects of the present invention have been described by way of example only and it should be appreciated that modifications and additions may be made thereto without departing from the scope of the claims herein.

What is claimed is:

1. A process of imparting increased durability and fire retardancy properties to lignocellulosic material, said process comprising:
    utilizing at least one of
        an impregnation treatment process,
        a spray system,
        an immersion system,
        a deluge system
    to penetrate a wood preservative and a flame retardant (FR) comprising one or more of alkali metal silicates and alkali metal aluminates into cellular internal voids of the lignocellulosic material;
    wherein the FR is selected from one or more of soluble alkali metal silicates including sodium silicate, potassium silicate, lithium silicate and soluble alkali metal aluminates, wherein said soluble alkali metal aluminates include sodium aluminate and potassium aluminate,
    wherein the FR further comprises aluminium oxide [$Al_2O_3$] nano-particle dispersions, aluminium silicate [$Al_2O_3.SiO_2$] nano-particle dispersions and silicon dioxide [$SiO_2$] nano-particle dispersions.

2. The process of claim 1, wherein the lignocellulosic material possesses a property of fire retardancy, or wherein the lignocellulosic material possesses a property of durability to one or more of fungal decay, rot, and insect attack, or wherein the wood preservative in combination with the FR generates an increase in durability to one or more of said fungal decay, said rot and said insect attack.

3. The process of claim 1, wherein the impregnation treatment process comprises gauge pressure ranges from 0 to 3,500 kpa and vacuum up to-90 kpa, or wherein the impregnation treatment process comprises chemical absorption ranges from 15 to 950 Litres/$m^3$.

4. The process of claim 1, further comprising allowing the wood preservative and the FR to co-penetrate during a wood impregnation treatment process.

5. The process of claim 1, wherein the wood preservative is selected from one or more of Copper Chrome Arsenate (CCA), dissolved Copper Azoles (dCA), micronized Copper Azoles (mCA), Alkaline Copper Quaternary (ACQ), micronized Copper Quaternary (mCQ), water based Azoles, tri-azoles, propiconazole, tebuconazole, cyproconazole and carbamates.

6. The process of claim 1, further comprising producing a stabilized liquid sodium aluminate solution by dissolving the sodium aluminate using chelating agents as a stabilizer or producing a stabilized potassium aluminate solution using the potassium aluminate using the chelating agents as the stabilizer.

7. The process of claim 6, wherein the chelating agents are selected from one or more of amine compounds, Ethylenediaminetetra-acetic acid (EDTA), Ethylene diamine (EN), Diethylenetriaminepenta-acetic acid (DTPA), (N-(hydroxyethyl)-ethylenediaminetriacetic acid) (HEDTA), Ethylene glycol tetra-acetic acid (EGTA), salts of gluconic acid, sodium gluconate, potassium gluconate, salts of tartaric acid, ethanolamine compounds, monoethanolamine (MEA), diethanolamine (DEA), triethanolamine (TEA).

8. The process of claim 1, wherein the aluminium oxide [$Al_2O_3$] nano-particle dispersions, the aluminium silicate [$Al_2O_3.SiO_2$] nano-particle dispersions and the silicon dioxide [$SiO_2$] nano-particle dispersions are suspensions in water or organic solvents.

9. The process of claim 8, wherein the organic solvents are selected from one or more of ethanol, mineral oils, and aromatic hydrocarbons and glycols.

10. The process of claim 1, further comprising providing other additives for the impregnation treatment process and the spray system selected from one or more of water repellents, colorants, stabilizers, and surfactants.

11. The process of claim 1, wherein the wood preservative in combination with FR liquids impregnate internal cellular voids as a liquid durable FR (dFR), and further comprising applying a heat or drying step that causes the liquid dFR to become insoluble, fixed and encapsulated within the lignocellulosic material.

12. The process of claim 1, wherein the wood preservative in combination with the FR produce a working solution.

13. The process of claim 12, further comprising providing wood or engineered wood products, and applying said soluble alkali metal silicates or applying said soluble alkali metal aluminates via one or more of said spray system, a brush, said immersion system and said deluge system to the wood or the engineered wood products.

14. The process of claim 13, wherein only the wood preservative undergoes the impregnation treatment process and the soluble alkali metal silicates or the soluble alkali metal aluminates are applied via one or more of said spray system, the brush, the immersion system and the deluge system to the wood or the engineered wood products.

15. The process of claim 12, wherein the soluble alkali metal silicates and the soluble alkali metal aluminates are applied via at least one of said spray system, immersion or deluge systems at a temperature range of 0° C. to 100° C.

16. The process of claim 1, wherein the wood preservative is impregnated into a substrate that retains the wood preservative such that a copper based wood preservative is retained in a range from 0.1 kg/m$^3$ copper to 20 kg/m$^3$ copper.

17. The process of claim 1, wherein the alkali metal silicates are impregnated into a substrate that retains the alkali metal silicates in a range from 0.2 kg/m$^3$ to 45 kg/m$^3$.

18. The process of claim 1, further comprising
fixating the FR with heat fixation, wherein the heat fixation comprises a temperature within a range of 50° C. to 150° C.,
or
thermally modifying the FR in a kiln with a thermal modification temperature in a range of 150° C. to 250° C.

19. The process of claim 1, wherein the lignocellulosic material is a wood species selected from one or more of *radiata* pine (*pinus radiata*), western red cedar and other cedars, Douglas fir, southern yellow pine, scots pine, hoop pine, slash pine and all other soft and hard type pines.

* * * * *